United States Patent
Nakagawa et al.

(12) United States Patent (10) Patent No.: US 11,326,559 B2
(45) Date of Patent: May 10, 2022

(54) LEAKAGE DETECTOR FOR FUEL VAPOR TREATMENT DEVICE

(71) Applicant: AISAN KOGYO KABUSHIKI KAISHA, Obu (JP)

(72) Inventors: Makoto Nakagawa, Nagoya (JP); Fumihito Nakatani, Obu (JP); Kazutaka Hioki, Kani (JP)

(73) Assignee: Aisan Kogyo Kabushiki Kaisha

( * ) Notice: Subject to any disclaimer, the term of this patent is extended or adjusted under 35 U.S.C. 154(b) by 187 days.

(21) Appl. No.: 16/627,276

(22) PCT Filed: May 23, 2018

(86) PCT No.: PCT/JP2018/019801
§ 371 (c)(1),
(2) Date: Dec. 27, 2019

(87) PCT Pub. No.: WO2019/017068
PCT Pub. Date: Jan. 24, 2019

(65) Prior Publication Data
US 2020/0217276 A1     Jul. 9, 2020

(30) Foreign Application Priority Data
Jul. 18, 2017   (JP) .............................. JP2017-139225

(51) Int. Cl.
*F02M 25/08* (2006.01)
*B60K 15/03* (2006.01)
*G01M 3/32* (2006.01)

(52) U.S. Cl.
CPC ......... *F02M 25/0818* (2013.01); *B60K 15/03* (2013.01); *F02M 25/0836* (2013.01);
(Continued)

(58) Field of Classification Search
CPC ........... F02M 25/0818; F02M 25/0836; F02M 25/0854; B60K 15/03; B60K 2015/03243; G01M 3/3209
(Continued)

(56) References Cited

U.S. PATENT DOCUMENTS

| 7,077,112 B2 | 7/2006 | Mitani et al. |
| 7,207,209 B2 | 4/2007 | Mitani et al. |

(Continued)

FOREIGN PATENT DOCUMENTS

| JP | 2004293296 A | 10/2004 |
| JP | 2005201234 A | 7/2005 |

(Continued)

OTHER PUBLICATIONS

PCT/JP2018/019801 International Preliminary Report on Patentability dated Jan. 21, 2020 (7 p.).
(Continued)

*Primary Examiner* — Mahmoud Gimie
(74) *Attorney, Agent, or Firm* — Conley Rose, P.C.

(57) ABSTRACT

A leakage detector for a fuel vapor treatment device includes a fuel vapor treatment device that maintains the interior of a treatment system of the fuel vapor treatment device in a sealed state. In addition, the leakage detector includes; a closing valve and shutoff valve that can shut off fluid communication between the fuel tank and the canister to section the interior of the treatment system into a first region including the fuel tank and a second region including the canister. Further, the leakage detector includes an aspirator that applies a negative pressure to the second region. The leakage detector for the fuel vapor treatment device determines the presence and/or absence of leakage in the first region on the basis of a change in the pressure in the first region while an engine is stopped and determines the
(Continued)

presence and/or absence of leakage in the second region on the basis of a change in the pressure in the second region by applying a negative pressure to the second region while the engine is operated.

8 Claims, 6 Drawing Sheets

(52) U.S. Cl.
CPC ...... *F02M 25/0854* (2013.01); *G01M 3/3209* (2013.01); *B60K 2015/03243* (2013.01)
(58) Field of Classification Search
USPC ....................................................... 123/495
See application file for complete search history.

(56) References Cited

U.S. PATENT DOCUMENTS

| | | | |
|---|---|---|---|
| 8,347,691 B2 | 1/2013 | Makino et al. | |
| 8,602,004 B2 * | 12/2013 | Ogita | F02M 25/089 123/521 |
| 8,683,852 B2 | 4/2014 | Makino | |
| 8,713,994 B2 | 5/2014 | Makino | |
| 2011/0308302 A1 * | 12/2011 | Makino | F02M 25/0836 73/40.7 |

FOREIGN PATENT DOCUMENTS

| | | | |
|---|---|---|---|
| JP | 2010265860 A | 11/2010 |
| JP | 2011157915 A | 8/2011 |
| JP | 2012002138 A | 1/2012 |
| JP | 2015075032 A | 4/2015 |

OTHER PUBLICATIONS

PCT/JP2018/019801 Written Opinion dated Jul. 17, 2018 (6 p.).
PCT/JP2018/019801 International Search Report and Written Opinion dated Jul. 17, 2018 (8 p.).
Japanese Office Action dated Apr. 17, 2020, for Japanese Application No. 2017-139225 (4 p.).
English Translation of Japanese Office Action dated Apr. 17, 2020, for Japanese Application No. 2017-139225 (4 p.).

* cited by examiner

LEAKAGE DETECTOR FOR FUEL VAPOR TREATMENT DEVICE

CROSS-REFERENCE TO RELATED APPLICATIONS

The present application is a National Phase entry of, and claims priority to, PCT Application No. PCT/JP2018/019801, filed May 23, 2018, which claims priority to Japanese Patent Application No. 2017-139225, filed Jul. 18, 2017, each of which is incorporated by reference herein in its entirety for all purposes.

STATEMENT REGARDING FEDERALLY SPONSORED RESEARCH OR DEVELOPMENT

Not applicable.

BACKGROUND

This disclosure relates generally to leakage detectors for fuel vapor treatment devices.

A vehicle utilizing fuel, such as gasoline, is often equipped with a fuel vapor treatment device that prevents emission of fuel vapor to the atmosphere, while reducing potential damage to a fuel tank caused by an increase in internal pressure of the fuel tank. However, if there is a crack or defective seal in the fuel vapor treatment device, fuel vapor may leak from the treatment device. It is difficult for a driver of the vehicle to recognize such fuel vapor leakage. Accordingly, a leakage detector that determines the presence and absence of leakage in the fuel vapor treatment device may be provided such as described in Japanese Laid-Open Patent Publication No. 2010-265860.

The leakage detector disclosed in Japanese Laid-Open Patent Publication No. 2010-265860 is configured to move air from a canister to a fuel tank in the fuel vapor treatment device. The leakage detector then shuts off communication between the fuel tank and the canister, so as to be in a state where the pressure in the canister is negative and the pressure in the fuel tank is positive. In this state where the communication between the fuel tank and the canister is shut off, leakage from both the fuel tank side and the canister side of an interior of a treatment system can be simultaneously detected on the basis of both a pressure change in the fuel tank and a pressure change in the canister.

BRIEF SUMMARY

In one aspect of this disclosure, a leakage detector for a fuel vapor treatment device comprises the fuel vapor treatment device, a sealing means, a shutoff mechanism, a first pressure detection means, a second pressure detection means, and a gas moving means. The fuel vapor treatment device also includes a fuel tank, a canister, and a fuel pump. The sealing means is configured to maintain an interior of a treatment system of the fuel vapor treatment device in a sealed state. The treatment system includes the fuel tank and the canister. The shutoff mechanism is configured to block communication between the fuel tank and the canister to divide the interior of the treatment system into a first region that includes the fuel tank and a second region that includes the canister. The first pressure detection means is configured to detect pressure in the first region. The second pressure detection means is configured to detect pressure in the second region. The gas moving means is configured to move gas from the canister to the fuel tank by utilizing fuel pumped from the fuel pump. The leakage detector for the fuel vapor treatment device is configured to perform a leakage diagnosis of the first region depending on a pressure change in the first region while an internal combustion engine is stopped. The leakage detector is configured to perform leakage diagnosis of the second region depending on a pressure change in the second region when the gas moving means applies a negative pressure to the second region in a state where the interior of the treatment system is sealed by the sealing means, while the internal combustion engine is running.

In accordance with this aspect, the leakage diagnosis of the first region, which contains the fuel tank, is performed while the internal combustion engine is stopped. The diagnosis of the second region, which contains the canister, is carried out while the internal combustion engine is being operated. Thus, power consumption can be reduced while the internal combustion engine is stopped, in comparison with a case where both of the leakage diagnoses are performed while the internal combustion engine is stopped.

In another aspect of this disclosure, the leakage detector for the fuel vapor treatment device is configured to perform the leakage diagnosis of the first region without applying pressure to the first region with the gas moving means when an absolute value of the differential pressure between the pressure in the first region closed by the shutoff mechanism and an atmospheric pressure is equal to or greater than a predetermined value. In addition, the leakage detector may perform the leakage diagnosis of the first region by applying a positive pressure to the first region with the gas moving means when the absolute value of the differential pressure between the pressure in the first region and the atmospheric pressure is less than the predetermined value.

In accordance with this aspect, the leakage diagnosis of the first region is performed without applying pressure to the first region with the gas moving means when the absolute value of the differential pressure between the internal pressure of the first region and the atmospheric pressure is equal to or greater than the predetermined value. Accordingly, the power consumption required for the leakage diagnosis of the first region can be decreased.

In another aspect of this disclosure, the leakage detector for the fuel vapor treatment device is configured to perform the leakage diagnosis of the second region based on both a pressure change in the second region while applying the negative pressure to the second region with the gas moving means and a pressure change in the second region that is closed by the sealing means and the shutoff mechanism after applying the negative pressure.

In accordance with this aspect, the leakage diagnosis of the second region is performed on the basis of both the pressure change in the second region during applying the negative pressure to the second region and the pressure change in the second region closed after applying the negative pressure. Thus, diagnostic accuracy can be improved.

DETAILED DESCRIPTION

As previously described, a leakage detector that determines the presence and absence of leakage in the fuel vapor treatment device may be provided to detect a fuel vapor leak from a fuel vapor treatment device of a vehicle. When an internal combustion engine of a vehicle or the like is running, it is generally difficult to precisely detect leakage from the fuel tank side of the treatment system because the pressure change within the fuel tank may be relatively high due to the fuel sloshing and consumption of the fuel. Accordingly, the leakage detector disclosed in Japanese Laid-Open Patent Publication No. 2010-265860, which is configured to simultaneously detect leakage on both the fuel tank side and the canister side of the treatment system, has to perform the leakage detection when the internal combustion engine is not running.

However, while the internal combustion engine is stopped, the leakage detector operates with the use of electric power supplied from a battery of the vehicle. However, since the electric power stored in the battery is relied on for starting the internal combustion engine, it is desirable to reduce power consumption when the internal combustion engine is not running.

Embodiments of fuel vapor treatment devices and methods for detecting fuel leaks with same are disclosed herein and described in more detail below. In embodiments described herein, the fuel vapor treatment devices are configured to prevent emission of fuel vapor vaporized in a fuel tank of a vehicle, such as an automobile, to the atmosphere. The fuel vapor treatment devices are also configured to temporarily trap the fuel vapor within a canister and then to burn the trapped fuel vapor in an internal combustion engine. Further, the fuel vapor treatment devices are equipped with a leakage detector configured to determine whether there is leakage from the treatment device.

Figure 1:
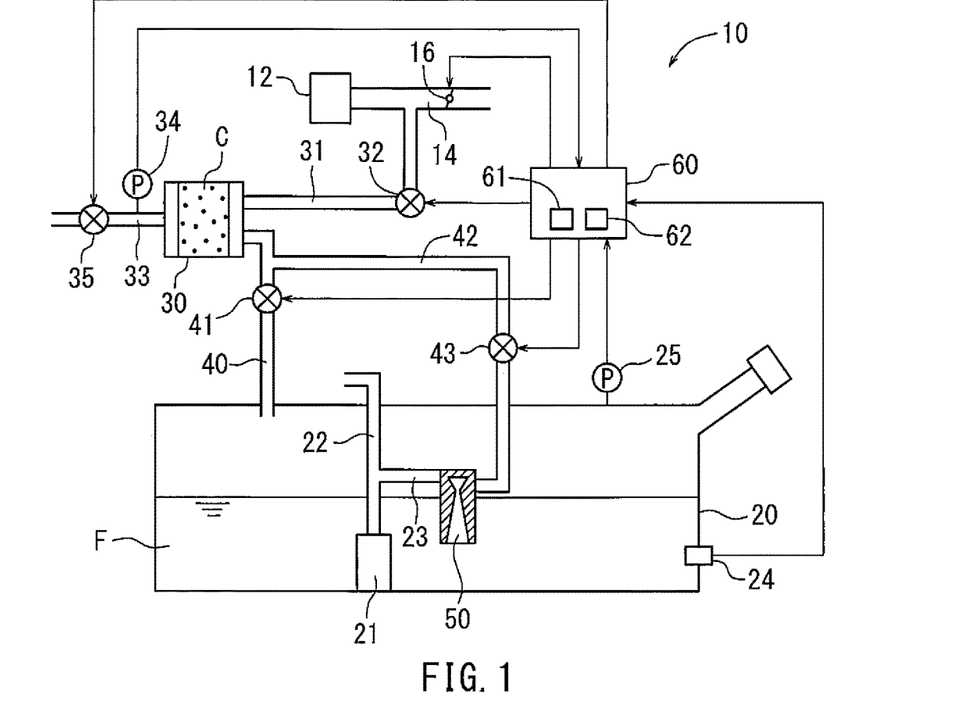
FIG. 1 is a schematic view of an embodiment of a fuel vapor treatment device and a leakage detector according to principles described herein.

Referring now to FIG. 1, an embodiment of a fuel vapor treatment device 10 is shown. In this embodiment, fuel vapor treatment device 10 includes a fuel tank 20 for storing fuel, such as gasoline, a canister 30 for adsorbing and desorbing fuel vapor, and a vapor passage 40 fluidly connecting the fuel tank 20 to the canister 30.

The fuel tank 20 is a sealed tank that stores fuel F, such as gasoline, that is supplied to an internal combustion engine 12. A fuel pump 21 for pumping the fuel F to the engine 12 is disposed in the fuel tank 20. The fuel pump 21 may be an electric pump having an integral motor. The fuel pump 21 is connected to a fuel supply pipe 22. The fuel F stored in the fuel tank 20 is supplied to the engine 12 via the fuel supply pipe 22. A branch pipe 23 branches from the middle of the fuel supply pipe 22. One end of the branch pipe 23 is attached to an aspirator 50 such that a portion of the fuel pumped from the fuel pump 21 is supplied to the aspirator 50. The fuel tank 20 includes a temperature sensor 24 for detecting temperature of the fuel F in the fuel tank 20 and a first pressure sensor 25 for measuring internal pressure of the fuel tank 20. The temperature sensor 24 and the first pressure sensor 25 output signals to an engine control unit (ECU) 60. The ECU 60 is configured to control the fuel vapor treatment device 10 based on signals from various sensors, including the first pressure sensor 25. The ECU 60 includes a memory 61 for storing various control programs and a processor 62 for executing the control programs.

The canister 30 is a sealed container filled with an adsorbent C composed of activated carbon or the like. As described above, the canister 30 is connected to the fuel tank 20 via the vapor passage 40. The canister 30 is configured to adsorb the fuel vapor vaporized in the fuel tank 20. The canister 30 is fluidly connected to a purge passage 31. The canister 30 is in communication with an intake pipe 14 of the engine 12, downstream of a throttle valve 16, via the purge passage 31. The purge passage 31 is provided with a purge valve 32 that is controlled to be opened and closed by the ECU 60.

The canister 30 is connected to an atmospheric passage 33 having one end open to the atmosphere. A second pressure sensor 34 and an atmospheric passage valve 35 are arranged in series along the atmospheric passage 33 between the canister 30 and the open end of the atmospheric passage 33. The second pressure sensor 34 detects the internal pressure of the atmospheric passage 33, which is substantially equal to the internal pressure of the canister 30. A signal corresponding to the detected pressure is then output to the ECU 60. The ECU 60 controls the atmospheric passage valve 35 to be open or closed. The purge valve 32 and the atmospheric valve 35 collectively define a "sealing system" that can be controllably closed to effectively seal canister 30 and fuel tank 20 from the surrounding atmosphere and other downstream components of fuel vapor treatment device 10.

A space above the fuel level (i.e., a gas space) in the fuel tank 20 is in communication with the canister 30 via the vapor passage 40. A closing valve 41 is disposed along the vapor passage 40 and may be opened or closed by the ECU 60. A bypass passage 42 is connected to the middle of the vapor passage 40 between the canister 30 and the closing valve 41. One end of the bypass passage 42 is connected to the aspirator 50, which is disposed in the fuel tank 20. Thus, when a negative pressure is generated in the aspirator 50, gas in the canister 30 is transferred into the fuel tank 20 via the bypass passage 42. An electromagnetic shutoff valve 43 is disposed along the bypass passage 42. The ECU 60 controls the shutoff valve 43 to be open or closed. In other embodiments, the bypass passage 42 is directly connected to the canister 30 and in parallel to the vapor passage 40. The closing valve 41 and the shutoff valve 43 collectively define a "shutoff system" for closing and shutting in fuel tank 20.

Figure 2:
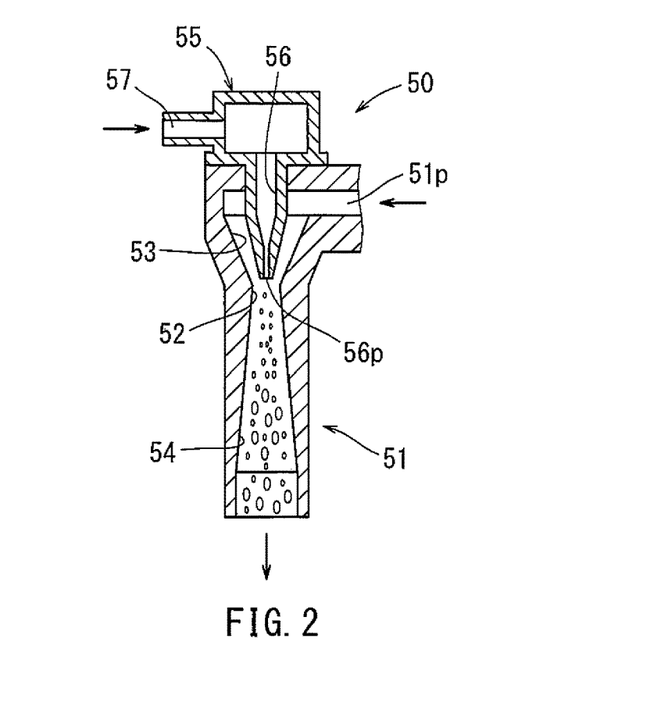
FIG. 2 is a cross-sectional view of the aspirator of FIG. 1.

The aspirator 50 has a structure that utilizes the flow of fuel supplied from the fuel pump 21 to generate negative pressure within the aspirator 50. As shown in FIG. 2, in this embodiment, the aspirator 50 includes a venturi section or part 51 and a nozzle section or part 55 upstream of the venturi part 51. The venturi part 51 includes a flow constriction 52, a diameter reducing, converging inlet part 53 having a tapered shape upstream of the constriction 52, and a diameter expanding, diverging outlet part 54 having a tapered shape downstream of the constriction 52. The converging inlet part 53, the constriction 52, and the diverging outlet part 54 are coaxially aligned. A suction port $51p$, which is connected to the bypass passage 42, is provided at an upstream end of the converging inlet part 53 of the venturi part 51.

The nozzle part 55 includes a nozzle body 56 extending coaxially into the converging inlet part 53 of the venturi part 51. A jet port 56p of the nozzle body 56 is positioned adjacent to the constriction 52 of the venturi part 51. A fuel supply port 57, which is connected to the branch pipe 23, is formed at the base of the nozzle body 56. The base of the nozzle body 56 is positioned opposite the jet port 56p.

Part of the fuel F discharged from the fuel pump 21 is introduced into the branch pipe 23 and subsequently into the aspirator 50 via the fuel supply port 57. That part of fuel F is jetted from the nozzle body 56, causing it to flow at a relatively high speed through centers of both the constriction 52 and the diverging outlet part 54. A negative pressure is generated adjacent to the constriction 52 of the venturi part 51 due to the Venturi effect. As a result, gas in the bypass passage 42, which is connected to the suction port 51p, is suctioned into the venturi part 51. Accordingly, the aspirator 50 defines a "gas suction device" or "gas moving device."

The fuel vapor treatment device 10 is controlled by the ECU 60, as described below, to prevent leakage of the fuel vapor vaporized in the fuel tank 20 into the atmosphere, depending on the condition of the vehicle.

While the vehicle is parked, both the closing valve 41 of the vapor passage 40 and the shutoff valve 43 of the bypass passage 42 are maintained in a closed state. As a result, the fuel tank 20 is maintained in a closed and sealed state, thereby suppressing generation of fuel vapor therein.

When refueling the fuel tank 20, the closing valve 41 of the vapor passage 40 and the atmospheric passage valve 35 of the atmospheric passage 33 are opened, while the purge valve 32 of the purge passage 31 and the shutoff valve 43 of the bypass passage 42 are maintained in a closed state. Consequently, mixed gas in the fuel tank 20, which is composed of the fuel vapor and air, is introduced into the canister 30 via the vapor passage 40. Then, the fuel vapor in the mixed gas is adsorbed on the adsorbent C in the canister 30, while the air is released into the atmosphere via the atmospheric passage 33.

When the engine 12 is running, both the closing valve 41 of the vapor passage 40 and the shutoff valve 43 of the bypass passage 42 are usually maintained in the closed state. However, when the predetermined purge condition is met during the running of the engine 12, a purge operation is carried out in order to purge fuel vapor from the canister 30. When the purge valve 32 and the atmospheric passage valve 35 are opened on the basis of signals output from the ECU 60, air flows into the canister 30 via the atmospheric passage 33 due to negative pressure in the engine 12. The fuel vapor in the canister 30 is desorbed from the adsorbent C by the introduced air. The fuel vapor is then supplied to the engine 12 via the purge passage 31, the fuel vapor being with the air. When the predetermined pressure release condition(s) is met, the closing valve 41 is opened during performing the purge operation to relieve the pressure of the fuel tank 20.

Next, leakage diagnosis (leakage detection) of the fuel vapor treatment device 10 will be described. The interior space of the treatment system of the fuel vapor treatment device 10 can be sealed by closing the purge valve 32 and the atmospheric passage valve 35. The interior space of the treatment system is divided into a first region including the fuel tank 20 and a second region including the canister 30 by closing the closing valve 41 and the shutoff valve 43. Leakage diagnosis of the second region, which contains the canister 30, is performed while the engine 12 is running. On the other hand, leakage diagnosis of the first region, which contains the fuel tank 20, can be performed while the engine 12 is stopped. The leakage diagnosis of each region will be described in detail below. Here, the ECU 60 controls each element of the fuel vapor treatment device 10 based on the control programs stored in the memory 61 to perform the leakage diagnosis of this disclosure.

Figure 3:
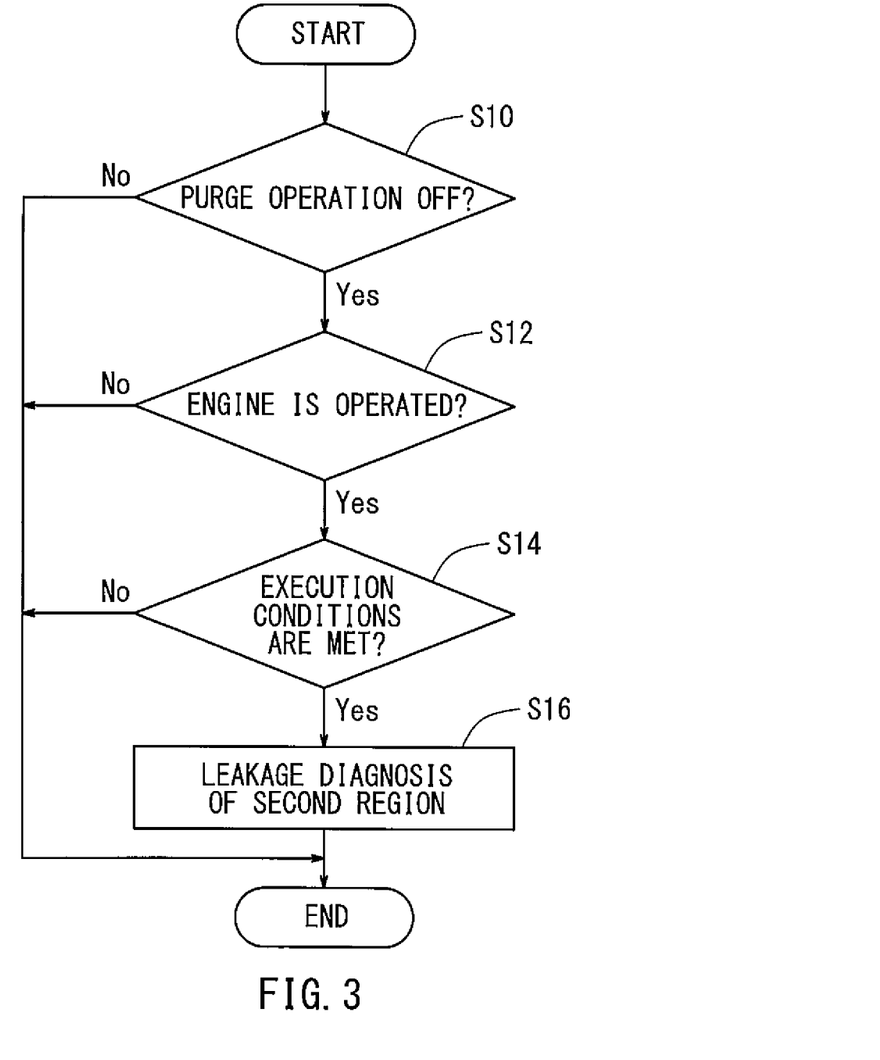
FIG. 3 is a flowchart illustrating an embodiment of a method of a leakage diagnostic of the second region of FIG. 1 containing the canister.
Figure 4:
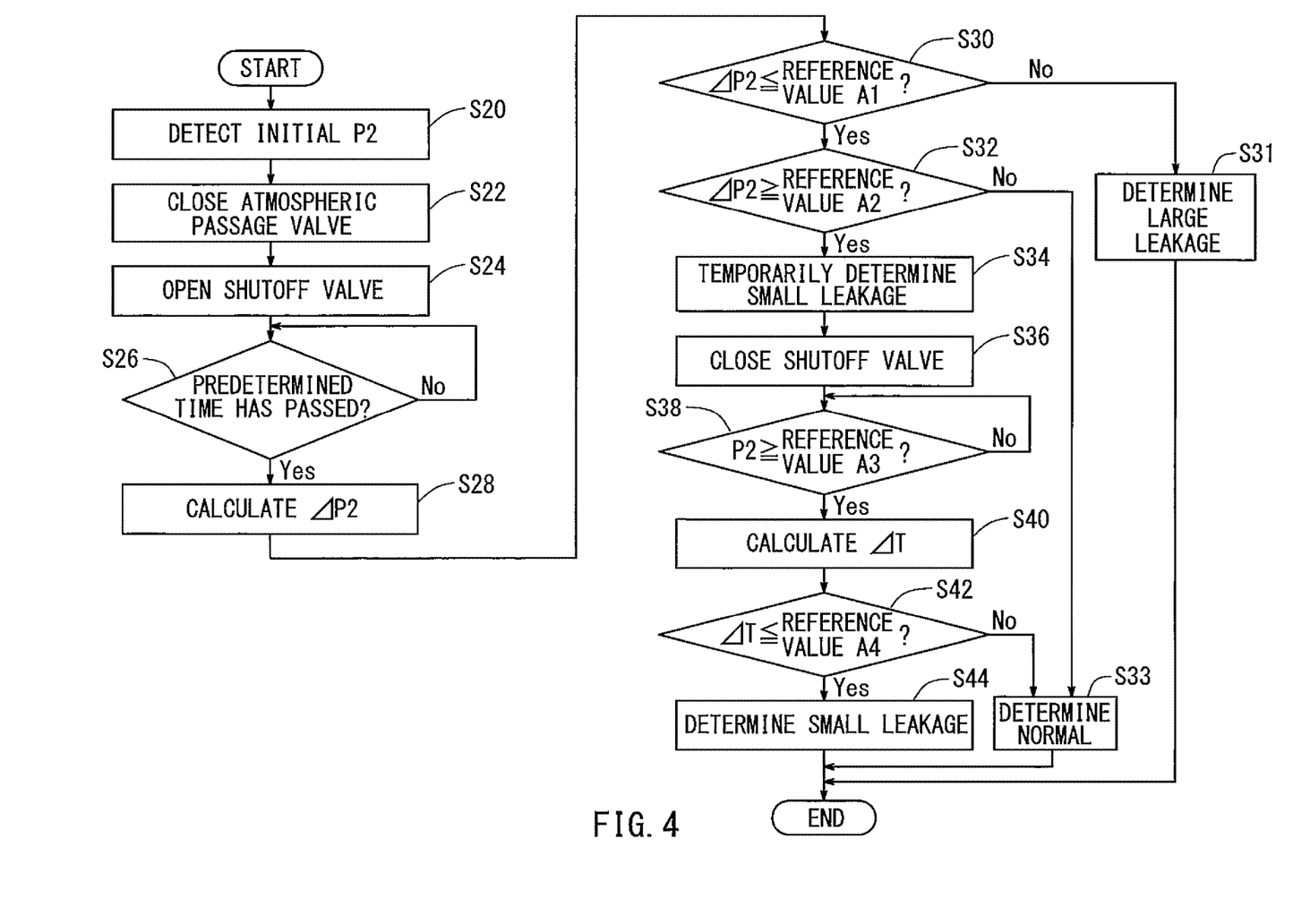
FIG. 4 is a flowchart illustrating the leakage diagnostic stage of the leakage diagnostic method of FIG. 3.
Figure 5:
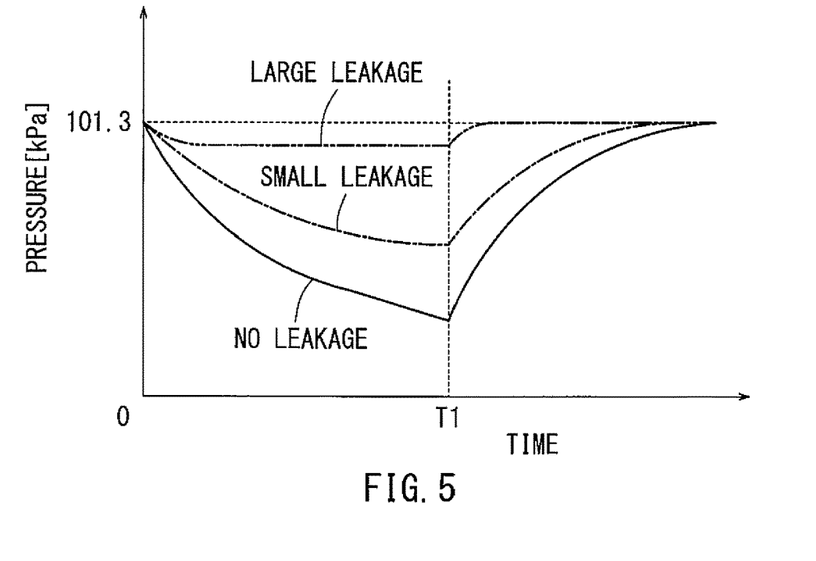
FIG. 5 is a graph illustrating the internal pressure of the second region of FIG. 1 during the leakage diagnosis method of FIG. 3.

First, the leakage diagnosis of the second region, which contains the canister 30, will be described with reference to FIGS. 3 to 5. FIG. 3 is a flowchart showing a whole leakage diagnostic process of the second region. FIG. 4 is a flowchart showing the details of the leakage diagnostic stage of the leakage diagnostic process of the second region. FIG. 5 is a graph showing a change in the internal pressure of the second region during the leakage diagnostic stage.

In the leakage diagnostic process of the second region, it is determined whether various conditions are met before determining the presence and/or absence of leakage. First, as shown in FIG. 3, it is determined whether the purge operation is off at Step S10. When Step S10 is determined to be Yes, it is determined whether the engine 12 is being operated at Step S12. When Step S12 is determined to be Yes, it is determined whether other execution conditions are met (e.g., whether a warming operation of the engine 12 has finished). When Step S14 is determined to be Yes, the leakage diagnosis of the second region is carried out at Step S16. When at least one of Steps S10, S12, or S14 is determined to be No, the leakage diagnostic process ends without performing the leakage diagnosis of the second region.

The flowchart of FIG. 4 shows the details of the leakage diagnosis of the second region performed at Step S16 of FIG. 3. At starting of the leakage diagnosis of the second region, the purge valve 32, the closing valve 41, and the shutoff valve 43 are closed; and the atmospheric passage valve 35 is open. First, the pressure (initial P2) within the atmospheric passage 33 (and accordingly the internal pressure of the second region) is measured by the second pressure sensor 34 under a condition where the atmospheric passage valve 35 is open at Step S20. Then, the atmospheric passage valve 35 is closed to seal the second region (Step S22). Next, the shutoff valve 43 of the bypass passage 42 is opened (Step S24). As a result, gas in the canister 30 moves into the fuel tank 20 due to the negative pressure generated in the aspirator 50. This also applies a negative pressure to the second region. This movement of the gas continues until a predetermined period of time (T1) passes (Step S26). When the predetermined period (T1) elapses, the pressure P2 within the atmospheric passage 33 is measured, and the pressure variation ΔP2 between the initial P2 and the currently measured pressure P2 (after predetermined period (T1)) is calculated (Step S28).

FIG. 5 shows the pressure change in the second region while the internal pressure of the second region decreases during at Step S26, which is shown between times 0 and T1 of the horizontal X-axis. In FIG. 5, the solid line shows a pressure change in a normal condition (where there is no leakage), the dashed line shows a pressure change in a small leak condition (where there is a relatively small leakage), and the two-dot line shows a pressure change in a large leak condition (where there is a relatively large leakage). As shown in FIG. 5, when the internal pressure of the second region is reduced during Step S26, the smaller the amount of leakage, the larger the decrease in pressure of the second region. That is, the smaller the amount of leakage, the smaller the pressure variation ΔP2 (and accordingly the larger the absolute value of the pressure variation ΔP2). Thus, the degree of leakage can be determined by comparing the pressure variation ΔP2 with reference values.

At Step S30, it is determined whether the pressure variation ΔP2 is equal to less than a predetermined reference value A1. When there is a relatively large amount of leakage, the internal pressure P2 of the second region slightly decreases at Step S26. Accordingly, the pressure variation ΔP2 is greater than the reference value A1. Thus, if step S30 is determined to be No due to the pressure variation ΔP2 being greater than the reference value A1, it is determined that the relatively large leakage condition (where there is large leakage) is present at Step S31. On the contrary, if Step S30 is determined to be Yes, it is next determined whether the pressure variation ΔP2 is equal to or greater than a predetermined reference value A2 at Step S32. When there is no leakage, the internal pressure P2 of the second region greatly decreases at Step S26. Accordingly, the pressure variation ΔP2 would be less than the reference value A2. Thus, when Step S32 is determined to be No, since the pressure variation ΔP2 is less than the reference value A2, it is determined that the normal condition (where there is no leakage) is present at Step S33. Alternatively, when Step S32 is determined to be Yes, it is temporarily determined that a relatively small leakage condition (where there is small leakage) is present at Step S34. Then, it is additionally determined whether there is actually a small leakage.

When it is temporarily determined there is a relatively small leakage, the shutoff valve 43 is closed at Step S36 to seal the second region. Then, the second region is maintained in a sealed state until the pressure P2 in the atmospheric passage 33 (the internal pressure of the second region) increases to be equal to or greater than a predetermined reference value A3 (Step S38). When the pressure P2 is equal to or greater than the reference value A3, an elapsed time ΔT from the point in time when the shutoff valve 43 was closed is calculated (Step S40).

FIG. 5 shows a pressure change in the second region during Step S38, on the right side of time T1. As shown in FIG. 5, the smaller the leakage amount, the longer the time required for the internal pressure of the second region to return to atmospheric pressure (101.3 kPa). Thus, the presence and/or absence of the small leakage is determined by comparing the elapsed time ΔT calculated at Step S40 with a predetermined reference value.

It is determined whether the elapsed time ΔT is equal to or less than a predetermined reference value A4 at Step S42. When there is no leakage, the pressure P2 in the second region requires a long time to be equal to or greater than the reference value A3 (Step S38). Therefore, the elapsed time ΔT would be greater than the reference value A4. When the elapsed time ΔT is greater than the reference value A4, Step S42 is determined to be No. Then, it is determined that the normal condition (where there is no leakage) is present at Step S33. On the contrary, when the elapsed time ΔT is equal to or less than the reference value A4, Step S42 is determined to be Yes. Then, it is determined that the small leakage condition (where there is small leakage) is present at Step S44. The leakage diagnosis of the second region including the canister 30 can be carried out in this manner. When all processes are finished, the purge valve 32, the atmospheric passage valve 35, the closing valve 41, and the shutoff valve 43 are returned to their conditions before starting the leakage diagnostic process.

Figure 6:
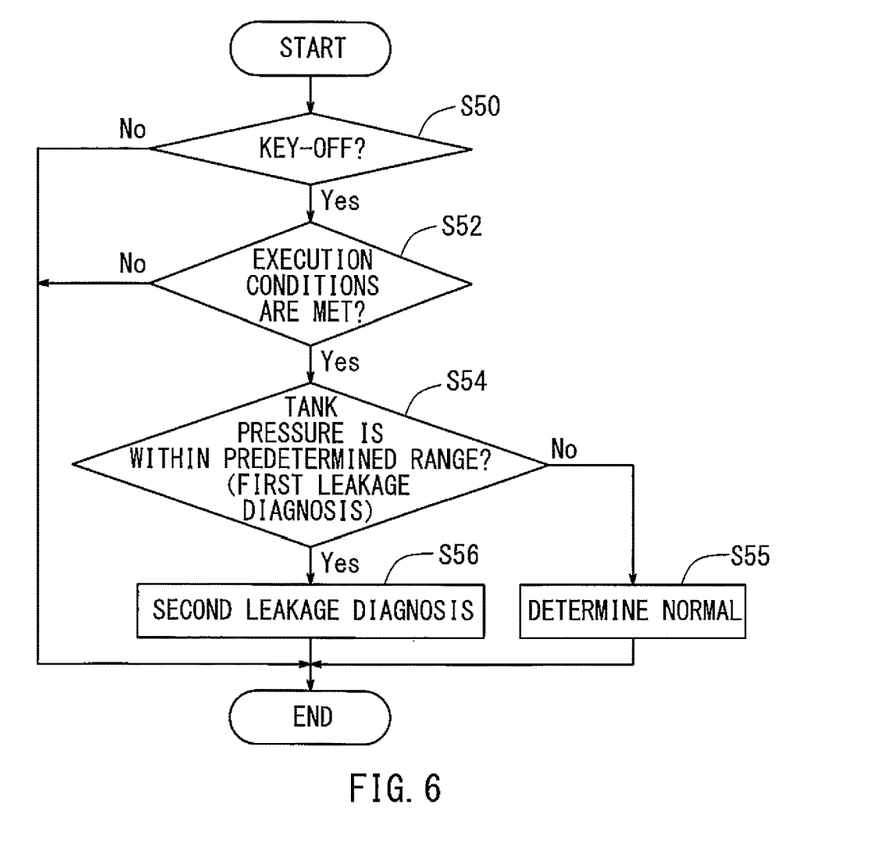
FIG. 6 is a flowchart illustrating an embodiment of a leakage diagnostic of the first region of FIG. 1 containing the fuel tank.
Figure 7:
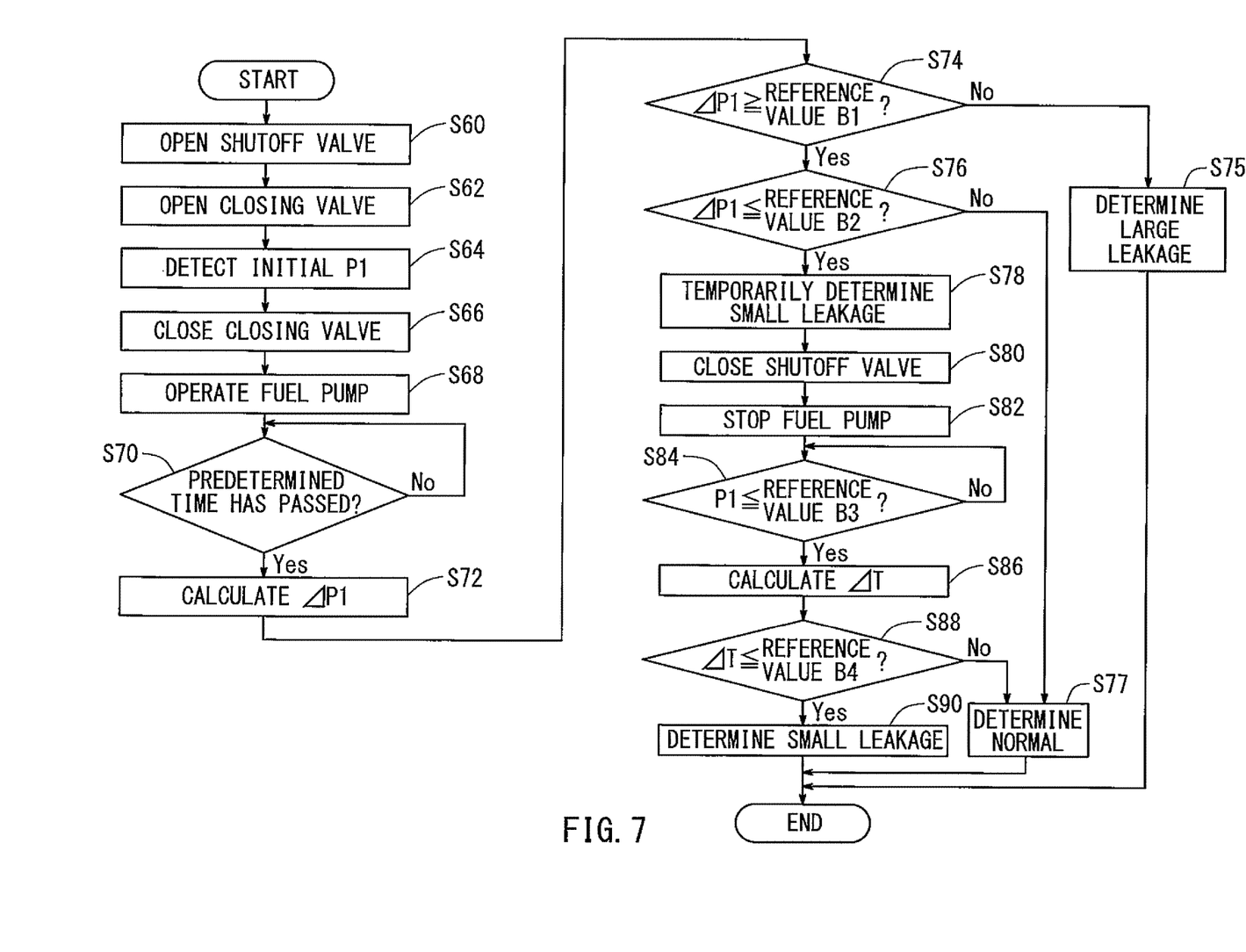
FIG. 7 is a flowchart illustrating the second leakage diagnostic stage of the leakage diagnostic method of FIG. 6.
Figure 8:
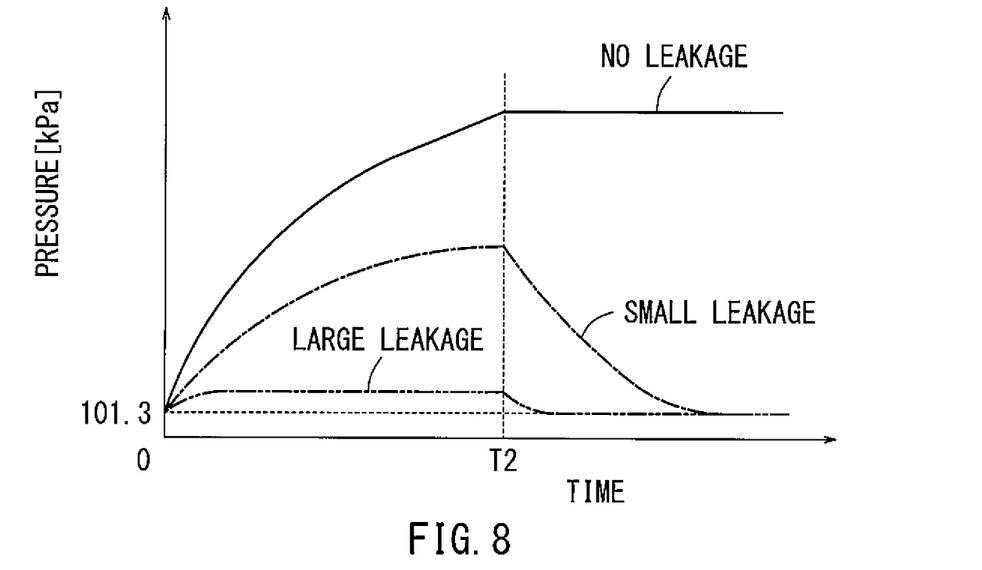
FIG. 8 is a graph showing the internal pressure of the first region of FIG. 1 during a second leakage method of FIG. 6.

Next, a leakage diagnostic process of the first region containing the fuel tank 20 will be described with reference to FIGS. 6 to 8. Although the details will be described later, in general the leakage diagnostic of the first region includes a first leakage diagnosis is performed without applying pressure to the first region and a second leakage diagnosis performed while applying positive pressure to the first region. FIG. 6 is a flowchart showing a whole leakage diagnostic process of the first region. FIG. 7 is a flowchart showing the details of the second leakage diagnosis of the leakage diagnostic process of the first region. FIG. 8 is a graph showing a pressure change in the first region during the second leakage diagnosis.

First, as shown in FIG. 6, it is determined whether a key-off condition is met (Step S50) because the leakage diagnosis of the first region on the fuel tank 20 side may be performed while the engine 12 is stopped. When Step S50 is determined to be Yes, it is determined whether execution conditions are met at Step S52. The execution conditions may include a predetermined time period has passed after stopping the engine 12, the temperature of the fuel in the fuel tank 20 decreases to a predetermined value, etc. When either of Step S50 or S52 is determined to be No, the leakage diagnostic process ends. On the contrary, when Step S52 is determined to be Yes, the first leakage diagnosis is carried out at Step S54.

After stopping the engine 12, the internal pressure of the sealed fuel tank 20 varies because of various factors, such as a temperature change in the fuel. However, if the first region, which includes the fuel tank 20, is in communication with the outside via a crack or the like, the internal pressure of the fuel tank 20 may be close to atmospheric pressure. Thus, in the first leakage diagnosis (Step S54), it is determined whether the internal pressure of the fuel tank 20 is within a predetermined range, more specifically, it may be determined whether an absolute value of the differential pressure between the internal pressure of the fuel tank 20 and the atmospheric pressure is less than a predetermined value. When the internal pressure of the fuel tank 20 is outside the predetermined range (i.e. the absolute value of the differential pressure between the internal pressure of the fuel tank 20 and the atmospheric pressure is equal to or greater than the predetermined value), Step S54 is determined to be No. Accordingly, it is determined that the normal condition (no leakage) is present at Step S55. On the contrary, when the internal pressure of the fuel tank 20 is within the predetermined range, Step S54 is determined to be Yes. Then, the second leakage diagnosis is performed at Step S56.

Next, details of the second leakage diagnosis at Step S56 will be described with reference to the flowchart of FIG. 7. In the second leakage diagnosis, the shutoff valve 43 and the closing valve 41 are initially opened (Steps S60 and S62), such that the first region is in communication with the second region via the vapor passage 40 and the bypass passage 42. The first pressure sensor 25 measures the pressure (initial P1) in the fuel tank 20 in this state (Step S64). Then, the closing valve 41 is closed at Step S66, and the fuel pump 21 is driven at Step S68. The aspirator 50 generates a negative pressure therein by utilizing the fuel supplied from the fuel pump 21, such that gas in the canister 30 is moved into the fuel tank 20 via the bypass passage 42. As a result, a positive pressure is applied to the interior of the fuel tank 20. When a predetermined period (T2) passes (Step S70), the pressure P1 in the fuel tank 20 is measured. Then, the pressure variation ΔP1 from the initial P1 is calculated (Step S72).

In FIG. 8, a pressure change during pressurization of the first region during Step S70 is shown between 0 and T2 on the horizontal X-axis. In FIG. 8, the solid line shows a normal condition (where there is no leakage), the dashed line shows a relatively small leakage condition (where there is relatively small leakage), and the two-dot line shows a relatively large leakage condition (where there is large leakage). As shown in FIG. 8, when the first region is pressurized during Step S70, the smaller the leakage amount, the larger the increase of the internal pressure of the fuel tank 20. That is, the smaller the leakage amount, the larger the pressure variation ΔP1. Thus, the degree of leakage can be determined by comparing the pressure variation ΔP1 with predetermined reference values.

As shown in FIG. 7, it is determined whether the pressure variation ΔP1 is equal to or greater than a predetermined reference value B1 at Step S74. When the pressure variation ΔP1 is less than the reference value B1, Step S74 is determined to be No. Accordingly, it is determined that the relatively large leakage condition (where there is a relatively large leakage) is present at Step S75. On the contrary, when the pressure variation ΔP1 is equal to or greater than the reference value B1, Step S74 is determined to be Yes. It is then determined whether the pressure variation ΔP1 is equal to or less than a predetermined reference value B2 at Step S76. When the pressure variation ΔP1 is greater than the reference value B2, Step S76 is determined to be No. Then, it is determined that the normal condition (where there is no leakage) is present at Step S77. On the contrary, when Step S76 is determined to be Yes, it is temporarily determined that the relatively small leakage condition (where there is relatively small leakage) is present at Step S78. Accordingly, it is then further determined whether there is actually a relatively small leakage.

When it is temporarily determined that the relatively small leakage condition is present at Step S78, the shutoff valve 43 is closed (Step S80) to seal the first region. The fuel pump 21 is also stopped (Step S82). Then, the first region is maintained in this sealed state until the pressure P1 in the fuel tank 20 (i.e. the pressure in the first region) decreases to be equal to or less than a predetermined reference value B3. FIG. 8 shows a pressure change during Step S84, on the right side of T2. As shown in FIG. 8, the smaller the leakage amount, the longer time the tank is maintained in the pressurized state.

When the pressure P1 decreases to be equal to or less than the reference value B3 at Step S84, an elapsed time ΔT from the time when the shutoff valve 43 was closed is calculated at Step S86. Then, it is determined whether the elapsed time ΔT is equal to or less than a predetermined reference value B4 at Step S88. When the elapsed time ΔT is equal to or less than the reference value B4, Step S88 is determined to be Yes. Then, it is determined that the relatively small leakage condition (where there is relatively small leakage) is present at Step S90. On the contrary, when the elapsed time ΔT is greater than the reference value B4, Step S88 is determined to be No. Accordingly, it is determined that the normal condition (where there is no leakage) is present at Step S77. The leakage diagnosis of the fuel tank 20 side is carried out in this manner. When all processes are finished, each of the purge valve 32, the atmospheric passage valve 35, the closing valve 41, and the shutoff valve 43 are returned to their conditions before starting the leakage diagnostic process.

In accordance with the above-described embodiment, the leakage diagnosis of the second region, which includes the canister 30, is performed while the engine 12 is running. Thus, in comparison with a case in which the leakage diagnosis must be carried out while the engine 12 is stopped, power consumption while the internal combustion engine 12 is stopped can be reduced, thereby improving fuel efficiency of the vehicle.

The leakage diagnosis of the first region, which has the fuel tank 20, includes a first diagnosis without applying pressure and a second diagnosis while applying pressure to the fuel tank 20. The second diagnosis is carried out when the first diagnosis determines that the normal condition is not present. In most cases, when the leakage diagnosis of the first region is performed, the first diagnosis determines that the normal condition exists. Accordingly, the second leakage diagnosis would not be carried out. Thus, the electric power required for the leakage diagnosis of the first region can be reduced.

In both the leakage diagnosis of the first region and the second region, a determination of a relatively small leakage is checked in two stages. Thus, a risk that a relatively small leakage is erroneously detected is decreased, thereby improving diagnostic precision.

The technique disclosed in this disclosure is not limited to the above-described embodiment. For example, the leakage diagnosis of the fuel tank 20 side may not include the first diagnosis. The object of the leakage detector of this disclosure is not limited to a fuel vapor treatment device of a vehicle. For instance, the leakage detector can be used for a fuel vapor treatment device mounted on a ship or the like.

The invention claimed is:

1. A leakage detector for a fuel vapor treatment device, the fuel vapor treatment device including a fuel tank, a canister, and a fuel pump, the leakage detector comprising:
    a sealing system configured to maintain an interior of a treatment system of the fuel vapor treatment device in a sealed state, wherein the treatment system includes the fuel tank and the canister;
    a shutoff system configured to block fluid communication between the fuel tank and the canister to divide the interior of the treatment system into a first region that includes the fuel tank and a second region that includes the canister;
    a first pressure sensor configured to detect a pressure in the first region;
    a second pressure sensor configured to detect a pressure in the second region; and
    a gas moving device configured to move gas from the canister to the fuel tank by utilizing fuel pumped from the fuel pump, wherein:
    the leakage detector is configured to perform a leakage diagnosis of the first region depending on the pressure in the first region while an internal combustion engine is stopped; and
    the leakage detector is configured to perform a leakage diagnosis of the second region depending on a pressure change in the second region when the gas moving device applies a negative pressure to the second region in a state where the interior of the treatment system is sealed by the sealing system, while the internal combustion engine is being operated.

2. The leakage detector of claim 1, wherein:
    the leakage detector is configured to perform the leakage diagnosis of the first region without applying pressure to the first region when an absolute value of a differential pressure between the pressure in the first region closed by the shutoff system and an atmospheric pressure is equal to or greater than a predetermined value; and
    the leakage detector is configured to perform the leakage diagnosis of the first region by applying a positive pressure to the first region using the gas moving device when the absolute value of the differential pressure between the pressure in the first region closed by the shutoff system and the atmospheric pressure is less than the predetermined value.

3. The leakage detector of claim 1, wherein:
the leakage detector is configured to perform the leakage diagnosis of the second region based on a pressure change in the second region during applying the negative pressure to the second region by the gas moving device and a pressure change in the second region that is closed by both the sealing system and the shutoff system after applying the negative pressure.

4. A leakage detector for a fuel vapor treatment device, comprising:
a sealing system configured to maintain an interior of a treatment system of the fuel vapor treatment device in a sealed state, wherein the treatment system includes a fuel tank and a canister;
a shutoff system configured to block fluid communication between the fuel tank and the canister to divide the interior of the treatment system into a first region that includes the fuel tank and a second region that includes the canister;
a first pressure sensor configured to detect a pressure in the first region;
a second pressure sensor configured to detect a pressure in the second region;
a gas moving device configured to move gas from the canister to the fuel tank; and
one or more processor configured to:
determine leakage from the first region based on the pressure in the first region while an internal combustion engine is stopped; and
determine leakage from the second region based on a pressure change in the second region when the gas moving device applies a negative pressure to the second region in a state where the interior of the treatment system is sealed by the sealing system, while the internal combustion engine is being operated.

5. The leakage detector of claim 4, wherein the one or more processor is configured to determine the leakage from the first region while the gas moving device does not apply a positive pressure to the first region.

6. The leakage detector of claim 4, wherein the one or more processor is further configured to calculate an amount of time for the pressure in the second region to reach a predetermined value after the shutoff system was closed.

7. The leakage detector of claim 5, wherein the one or more processor is further configured to calculate a pressure change in the first region while the gas moving device applies the positive pressure to the first region, and to determine the leakage from the first region based on the pressure change in the first region.

8. The leakage detector of claim 7, wherein the one of more processor is configured to calculate the pressure change in the first region if the pressure in the first region while the gas moving device does not apply the positive pressure to the first region is within a predetermined range.

* * * * *